April 13, 1937.　　F. H. HALSTEAD　　2,076,635
CLUTCH
Filed Oct. 17, 1935　　2 Sheets-Sheet 1

INVENTOR
Frederick H Halstead
BY
ATTORNEY

April 13, 1937.   F. H. HALSTEAD   2,076,635
CLUTCH
Filed Oct. 17, 1935   2 Sheets-Sheet 2

INVENTOR
Frederick H. Halstead
BY
ATTORNEY

Patented Apr. 13, 1937

2,076,635

UNITED STATES PATENT OFFICE 2,076,635

CLUTCH

Frederick H. Halstead, Albany, N. Y., assignor to Ramsey Chain Company, Inc., Albany, N. Y., a corporation of New York Application October 17, 1935, Serial No. 45,428

17 Claims. (Cl. 192—47)

This invention relates to clutches intended for the transmission of power and adapted to make and break at will the connection between a driving and a driven element.

It is the object of the invention to provide a clutch of simple and sturdy construction which will permit gradual assumption of the load in starting and the gradual release thereof in stopping, thus avoiding shocks and strains such as result frequently in the use of clutches of types heretofore known and used.

Other objects and advantages of the invention will be apparent as it is better understood by reference to the following specification and the accompanying drawings, in which Fig. 1 is a longitudinal section through a clutch embodying the invention, with the elements engaged;

Figure 3:
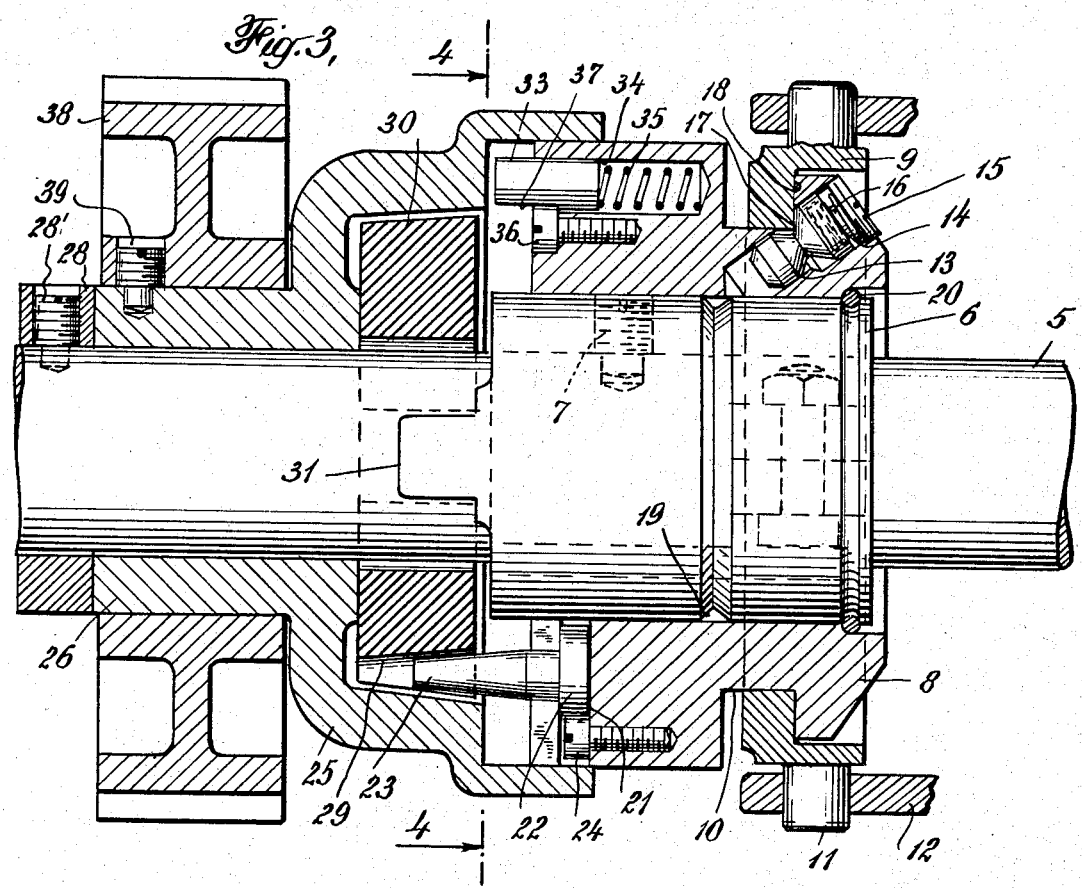
Fig. 3 is a section similar to Fig. 1 showing the elements disengaged.
Figure 4:
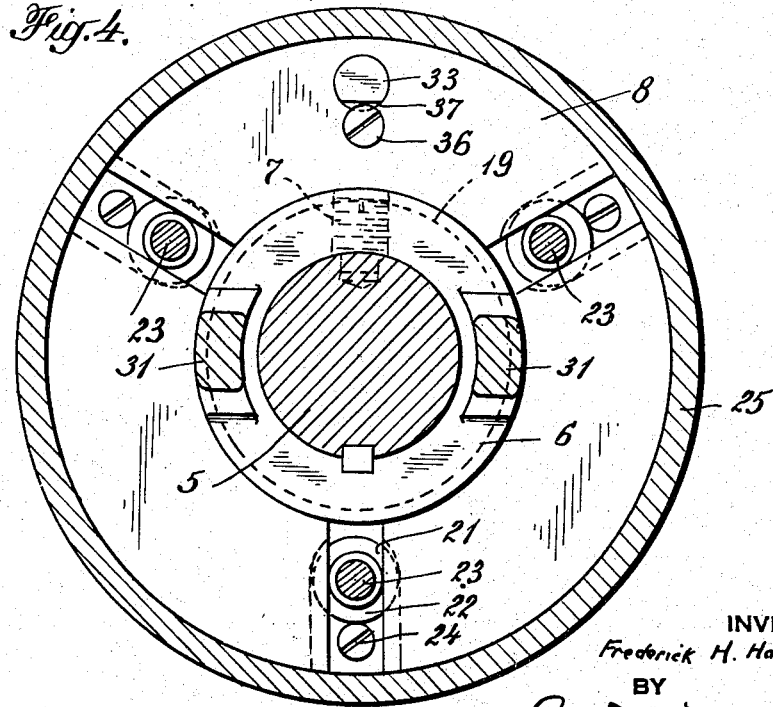
Fig. 4 is a section on the line 4—4 of Fig. 3.

Referring to the drawings, 5 indicates a shaft which for the moment may be considered as the driving member. A hub 6 is secured to the shaft 5 by a set screw 7 and revolves therewith. A sleeve 8 is rotatably supported on the hub 6 and is capable of longitudinal movement with respect thereto when actuated by a collar 9 disposed in a recess 10 in the sleeve 8 and having lugs 11 which may be connected by links 12 to a pivoted lever (not shown) or other means for actuating the collar manually or otherwise. A locking pin 13 is disposed in a suitable recess 14 in the collar 9 and is resiliently biased toward the hub 6 by a spring 14' disposed between the pin and a threaded plug 15 which closes the recess. The plug 15 has a stop 16 on the inner face thereof to limit the rearward movement of the locking pin. The locking pin is provided with a shoulder 17 which is adapted to be engaged by an opposed shoulder 18 on the collar 9 whereby the locking pin may be withdrawn from the position indicated in Fig. 1 to that indicated in Fig. 3 by movement of the collar. When the locking pin is in the position indicated in Fig. 1, it engages a groove 19 in the hub 6 to lock the parts in power-transmitting position. A ring 20 on the hub 6 limits rearward movement of the sleeve 8 when actuated by the collar 9.

The sleeve 8 is provided with a plurality of recesses 21 adapted to receive heads 22 of conical rollers 23. The rollers are preferably made of hardened steel, are adapted to rotate with respect to the sleeve 8, and are capable of limited radial movement relative to the sleeve, such movement being limited by stop screws 24 which prevent the rollers from escaping from their slots. The rollers 23 are adapted to co-operate with the inner conical surface of a clutch member 25 supported on a hub 26 which is mounted for rotation on the shaft 5, and with similar surfaces in recesses 29 formed in the periphery of a floating ring 30. The hub 26 is held against endwise movement by a collar 28 secured by a set screw 28' to the shaft 5.

The floating ring 30 is disposed between the hub 6 and the clutch member 25, and is supported by lugs 31 at the opposite sides of the hub 6, which loosely engage slots 32 in the floating ring. Thus, the floating ring rotates with the hub 6 and by engagement with the rollers 23 causes the sleeve 8 also to rotate with the hub 6.

Figure 1:
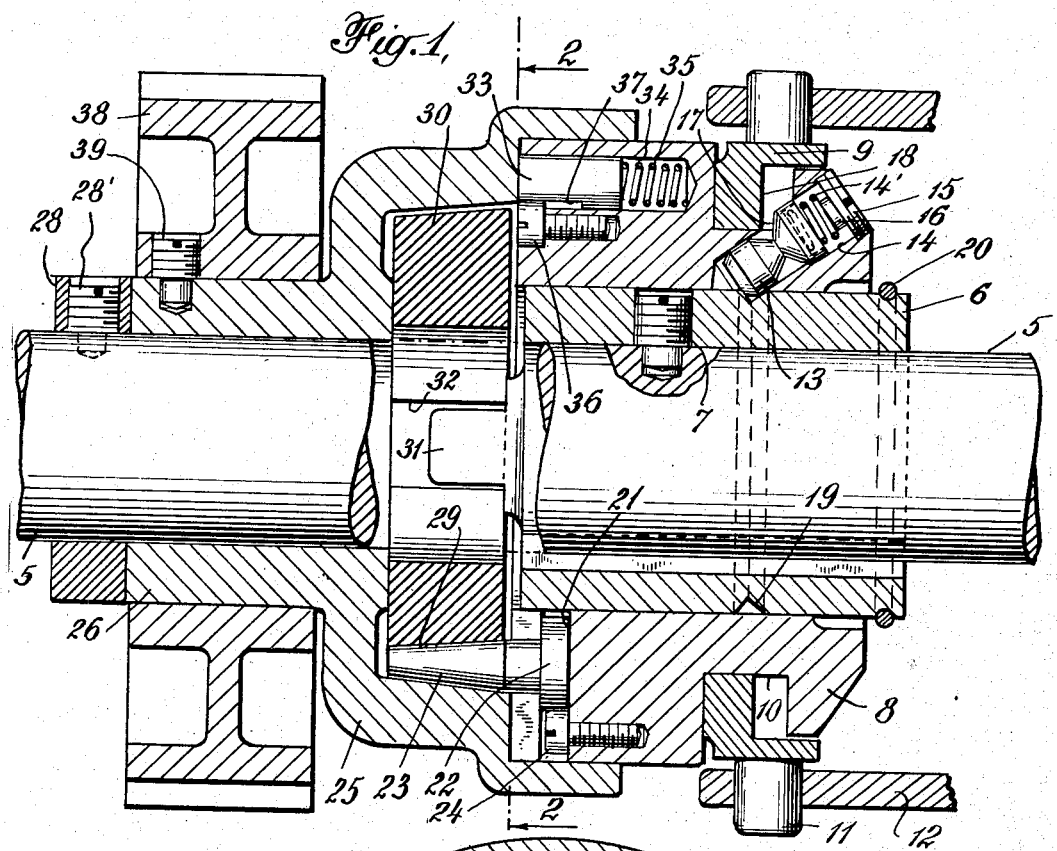
Figure 2:
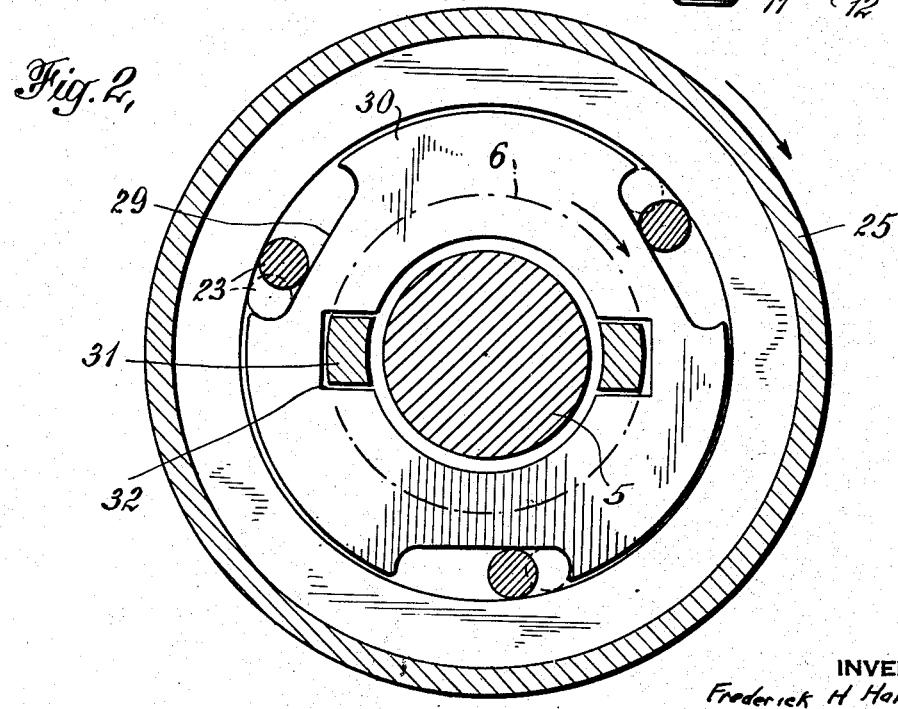
Fig. 2 is a section on the line 2—2 of Fig. 1.

When power is to be transmitted, the collar 9 is shifted to the position indicated in Fig. 1, carrying with it the sleeve 8. The rollers 23 are thus advanced and caused to wedge gradually between the floating ring 30 and the inner conical surface of the clutch member 25. The rollers 23 are caused to rotate as they gradually take up the load and assume finally the positions indicated in full lines in Fig. 2, in which they are wedged firmly between the floating ring 30 and the inner conical surface of the clutch member 25. The rollers cease to rotate as the full load is taken up when power is transmitted to the hub 26. The floating ring 30 permits a degree of adjustment between the parts so that smooth and satisfactory operation is assured. As the parts assume their final position, the locking pin 13 engages the notch 19 and the parts remain in driving position until the clutch is intentionally disengaged.

When the hub 26 is the driving member, I find it desirable to provide means to start rotation of the sleeve 8 and provide, therefore, a friction shoe 33 in a recess 34 in the sleeve 8 with a spring 35 to resiliently bias the shoe toward a surface of the clutch member 25. Movement of the shoe is limited by a stop screw 36 in the sleeve 8, the head of which engages a slot 37 in the shoe. As will be seen by reference to Fig. 3, the shoe 33 is inoperative when the clutch is disengaged, but as the sleeve 8 is moved to clutch-engaging position, the shoe 33 first engages the clutch member 25 and tends to cause rotation of the sleeve 8 with the clutch member and thereby move the conical rollers 23 respectively into one end of their corresponding recesses 29 before the rollers are shifted into power-transmitting engagement.

As the sleeve 8 is advanced, the rollers 23 are engaged and finally locked between the floating ring 30 and the conical inner surface of the clutch member 25 in the manner hereinbefore described, and power is transmitted from the hub 26 to the shaft 5.

The hub 26 may carry a pulley, gear, sprocket or other means for transmitting power. Such device, indicated at 38, is mounted on the hub 26 and secured thereto by a set screw 39. Power may thus be transmitted through the clutch to or from any machine.

Due to the shape of the pockets 29 in the periphery of the floating ring 30 and the arrangement of the structure set forth above the clutch may be utilized to transmit power in either direction of rotation and from the shaft 5 to the hub 26, or from the hub 26 to the shaft 5, as may be desired. The operation of engaging and disengaging the clutch is smooth and avoids unnecessary strain upon the various parts. The elements of the clutch are self-adjusting and substantially free from wear under ordinary operating conditions. The size of the clutch and of the parts thereof can be modified to meet the requirements of the load.

Various changes may be made in the details of construction without departing from the invention or sacrificing any of the advantages thereof.

I claim:

1. In a two-way-acting clutch, driving and driven members, one of the members having a conical inner surface, and power-transmitting means between the members including conical rollers and a ring capable of a limited rotary movement and having surfaces adapted to engage the rollers in power-transmitting relation when the parts are rotating in either direction.

2. In a clutch, driving and driven members, one of the members having a conical inner surface, power-transmitting means between the members including conical rollers and a floating ring having surfaces adapted to engage the rollers, and means for shifting the rollers axially into and out of power-transmitting engagement.

3. In a clutch, driving and driven members, one of the members having a conical inner surface, power-transmitting means between the members including conical rollers and a floating ring having surfaces adapted to engage the rollers, means for shifting the rollers into and out of power-transmitting engagement, and means for locking the rollers in power-transmitting engagement.

4. In a clutch, driving and driven members, one of the members having a conical inner surface, power-transmitting means between the members including conical rollers and a floating ring having surfaces adapted to engage the rollers, means for shifting the rollers into and out of power-transmitting engagement, and resiliently biased friction means adapted to first engage when the rollers are shifted to power-transmitting engagement.

5. In a two-way-acting clutch, driving and driven members, one of the members having a conical inner surface, and power-transmitting means between the members including conical rollers capable of limited radial movement, and a ring capable of a limited rotary movement and having surfaces adapted to engage the rollers in power-transmitting relation when the parts are rotating in either direction.

6. In a two-way-acting clutch, driving and driven members, one of the members having a conical inner surface, and power-transmitting means between the members including conical rollers and a ring capable of a limited rotary movement and loosely connected for rotation with one of the members, having surfaces adapted to engage the rollers in power-transmitting relation when the parts are rotating in either direction.

7. In a two-way-acting clutch, driving and driven members, one of the members having a conical inner surface, and power-transmitting means between the members including conical rollers capable of limited radial movement, and a ring capable of a limited rotary movement and loosely connected for rotation with one of the members, having surfaces adapted to engage the rollers in power-transmitting relation when the parts are rotating in either direction.

8. In a clutch, driving and driven members, one of the members having a conical inner surface, and power-transmitting means between the members including conical rollers capable of limited radial movement, and a floating ring loosely connected for rotation with one of the members, having surfaces adapted to engage the rollers in power-transmitting relation, and means for shifting the rollers axially into and out of power-transmitting engagement.

9. In a clutch, a hub, a sleeve thereon movable longitudinally with respect thereto, a plurality of conical rollers supported by the sleeve, a floating ring supported by the hub, rotatable therewith and capable of limited movement with respect thereto, the ring having surfaces adapted to engage the rollers, a clutch member having an inner conical surface adapted to be engaged by the rollers and means for shifting the sleeve whereby the rollers are wedged between the surfaces of the floating ring and the inner conical surface of the clutch member.

10. In a clutch, a hub, a sleeve thereon movable longitudinally with respect thereto, a plurality of conical rollers supported by the sleeve, a floating ring supported by the hub, rotatable therewith and capable of limited movement with respect thereto, the ring having surfaces adapted to engage the rollers, a clutch member having an inner conical surface adapted to be engaged by the rollers and means for shifting the sleeve whereby the rollers are wedged between the surfaces of the floating ring and the inner conical surface of the clutch member, and means for locking the sleeve in clutch-engaging position.

11. In a two-way-acting clutch, driving and driven members, one of the members having a conical inner surface, and power-transmitting means between the members including conical rollers and a ring having a plurality of recesses in its periphery to receive the rollers with surfaces adapted to be engaged thereby in power-transmitting relation when the parts are rotating in either direction.

12. In a clutch, driving and driven members, one of the members having a conical inner surface, and power-transmitting means between the members including conical rollers and a ring having a plurality of recesses in its periphery to receive the rollers with surfaces adapted to be engaged thereby in power-transmitting relation, and means for shifting the rollers axially into and out of power-transmitting engagement.

13. In a clutch, driving and driven members, one of the members having a conical inner surface, and power-transmitting means between the members including conical rollers and a ring having a plurality of recesses in its periphery to receive the rollers with surfaces adapted to be engaged thereby, means for shifting the rollers into and out of power-transmitting engagement and means for locking the rollers in power-transmitting engagement.

14. In a clutch, driving and driven members, one of the members having a conical inner surface, and power-transmitting means between the members including conical rollers and a ring having a plurality of recesses in its periphery to receive the rollers with surfaces adapted to be engaged thereby, means for shifting the rollers into and out of power-transmitting engagement and resiliently biased friction means adapted to first engage when the rollers are shifted to power-transmitting engagement.

15. In a two-way-acting clutch, driving and driven members, one of the members having a conical inner surface, and power-transmitting means between the members including conical rollers capable of limited radial movement and a ring having a plurality of recesses in its periphery to receive the rollers with surfaces adapted to be engaged thereby in power-transmitting relation when the parts are rotating in either direction.

16. In a clutch, driving and driven members, one of said members having a conical inner surface, power-transmitting means between the members including conical rollers and an inner member having a plurality of circumferentially-extended recesses in its periphery to receive the conical rollers, means for shifting the rollers into power transmitting engagement with said inner member and means for moving the conical rollers respectively into an end of a recess before the rollers are shifted into power-transmitting engagement.

17. In a clutch, driving and driven members, one of said members being an outer one having a conical inner surface, power-transmitting means between said members including conical rollers and an inner member having a plurality of recesses with ends forming pockets for receiving the smaller ends of said conical rollers when the parts are in non-driving relation, and means for shifting the rollers axially into power-transmitting relation to said inner member and said outer member, the axial shifting of said rollers initially causing the rollers to be brought into a position where they are revolved under pressure in the ends of their respective pockets.

FREDERICK H. HALSTEAD.